United States Patent [19]

Amabile et al.

[11] Patent Number: 4,796,913
[45] Date of Patent: Jan. 10, 1989

[54] SAFETY BAR FOR VEHICLES

[75] Inventors: Gerald Amabile; Ronald Rogers, both of Jessup, Pa.

[73] Assignee: Safety Research and Manufacturing, Inc., Archbold, Pa.

[21] Appl. No.: 23,798

[22] Filed: Mar. 9, 1987

[51] Int. Cl.4 .............................................. B60R 21/01
[52] U.S. Cl. ..................................... 280/751; 297/488
[58] Field of Search ............... 280/751, 748, 753, 650; 297/487, 488; 104/241

[56] References Cited

U.S. PATENT DOCUMENTS

| | | | |
|---|---|---|---|
| 1,102,822 | 7/1914 | Thompson | 104/241 |
| 2,927,628 | 3/1960 | Gill | 280/650 |
| 4,681,344 | 7/1987 | Majerus | 280/751 |

Primary Examiner—David M. Mitchell
Assistant Examiner—Karin L. Ferriter
Attorney, Agent, or Firm—Eugene E. Renz, Jr.

[57] ABSTRACT

A restraining device for use with bench seats of the type used in school buses, wherein the restraining bar is attached to a forward seat to restrain passengers in the rearward seat directly behind the forward seat. The device includes a hinge plate mounted on the frame of the forward seat presenting a profiled cam with a generally arcuate rear face having an upper limit position, a lower limit position, and a locking lower position. The plate means has a pivot pin on the outside of said plate. A restraining bar is provided with a restraining support sized to be positioned across the waist of passengers seated in the rearward seat. The restraining bar has an arm at each end of said support and extends to the frame of the forward seat. The arm has a slot sized to receive the pivot pin of the hinge plate. The arm further has a lock pin sized and positioned to cooperatively contact the generally arcuate rear face to position the arm generally vertically in the upper limit position and generally horizontally in the lower limit position.

14 Claims, 3 Drawing Sheets

SAFETY BAR FOR VEHICLES

FIELD OF THE INVENTION

This invention relates to a restraining device for use with bench seats of the type used in school buses. The restraining device is attached to a forward seat and is adapted to restrain movement of passengers sitting in the seat directly behind that forward seat.

BACKGROUND OF THE INVENTION

Many different kinds of safety devices for motor vehicles are known. Seat belts are the most common and preferred safety devices for automobiles, particularly with a shoulder harness arrangement. Air bags have been proposed for automobiles and the like and the drawbacks of those devices are wellknown. Nevertheless, the concern for the safety of passengers in vehicles continues to be of primary importance to those responsible for the safety of the passengers.

One design which shows a protection device particularly for passengers of motor vehicles in which the impact device is pivoted from a rest position into a use position is shown in U.S. Pat. No. 3,924,874. This device includes a padded cushion mounted on a pair of arms which are fastened to the seat in front of the passenger. The arms pivot about the fastening points of the four-point safety belts which are used for the passenger in front. The restraining device is also fastened to the frame of the vehicle and appears to be positioned to restrain the upper portion of the passenger's body, such as in the chest area.

A similar restraining system is shown in U.S. Pat. No. 3,951,429. In this system, the primary restraint comprises an energy dissipation dampening means but also includes a forward-shaped part which again is designed to impact in the chest areas of the passenger riding in the rear seat.

In U.S. Pat. No. 3,917,339, a system is shown in which an energy absorbing apparatus is provided for a row of interconnected seats such as on a school bus. The intention of this system is to isolate a row of vehicle seats from the remainder of the vehicle during an accident. The design is apparently intended to be used with conventional seat belts.

Finally, U.S. Pat. No. 3,393,010, describes a safety bar design which may be substituted for a customary seat belt and which extends across the lap of a person seated in the rear seat of a vehicle. The arms of the restraining device are fastened to a pivotedly supported cylinder constituting an element of a hydraulic locking device. The hydraulic locking device locks the bar in an operative position over the knees of the occupant of the seat.

None of the above devices particularly address the problems found in successfully developing a substitute for shoulder/harness-type seat belts. A particular concern is the need for an adequate restraining device for use with bench seats of the type used in school buses. It is important that the use can be enforced by a driver whose authority is oftentimes questioned by the children. There is a need to compensate for the attitude of children and young people who refuse to wear seat belts or resent wearing seat belts. There is also a need to verify the use of the safety device in a manner which permits the bus driver or other monitor to quickly and accurately verify that the device is in use in every seat throughout the vehicle.

Another important concern in the design of restraining devices for use with bench seats, is the concern that during a collision, the safety bar would rise with the momentum of the crash, causing the passenger to submarine or slip under the bar, possibly resulting in even more serious injury. It is particularly important to keep the lap end of the bar riding in the passenger's hip area without rising and causing possible excessive abdominal loads.

SUMMARY OF THE INVENTION

It has now been discovered that a restraining device for use with bench seats of the type used in school buses may be provided to accomplish the above and other objects of the present invention. The restraining bar is attached to a forward seat to restrain passengers in a rearward seat directly behind that forward seat. Of course, a plurality of restraining devices would be provided so that each seat would have its own restraining bar attached to the seat immediately in front of that device.

The restraining device comprises a hinge plate means which is mounted on the frame of the forward seat. The plate presents a profiled cam with a generally arcuate rear face having an upper limit position, a lower limit position, and a locking lower position. The plate also has a pivot pin on the outside facing away from the frame of the seat. Normally, a hinge plate is mounted on both sides of the forward seat and contains a pair of pivot pins extending slightly out from the sides of the seat. The rear face and pivot pin portions of the hinge plate are located so that the lower limit position and the pivot pin are aligned generally in a horizontal line which extends to the waist area of any passenger riding in the rearward seat.

The second portion of the device is a restraining bar which has a restraining support sized to be positioned across the waist of passengers seated in the rearward seat. The restraining bar has an arm at each end of the support which extends to the frame of the forward seat and interacts with the hinge plate on each side of the forward seat. The arm has a lock pin which is sized and positioned to cooperatively contact the generally arcuate rear face. The arm also has a slot which is sized to receive the hinge plate pivot pin. Thus, in combination, the pivot pin and the lock pin operate in the slot and on the arcuate surface to position the arm generally vertically when the lock pin is in the upper limit position of said arcuate face and generally horizontal when the lock pin is in the lower limit position.

In a preferred embodiment, the lock pin and slot on the arm cooperate with the pivot pin and arcuate rear face on the hinge plates to define a normal first horizontal position for the arm, whereby the restraining support is positioned transverse across the waist of passengers seated in the rearward seat. When the restraining bar is forced towards the forward seat, such as in the event of a collision or sudden force tending to throw the passenger forward against the restraining device, the slot and lock pin on the arm cooperate with the pivot pin and arcuate rear face to move to a second locking lower position in which the lock pin is lower than the pivot pin. At this point, the restraining bar is moved to a lower position on the lap of the passenger thereby overcoming tendencies for the restraining support to rise during the collision. The passenger is thereby protected against excessive abdominal loads. The design successfully resists the submarining problem of passengers falling beneath the restraining bar.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
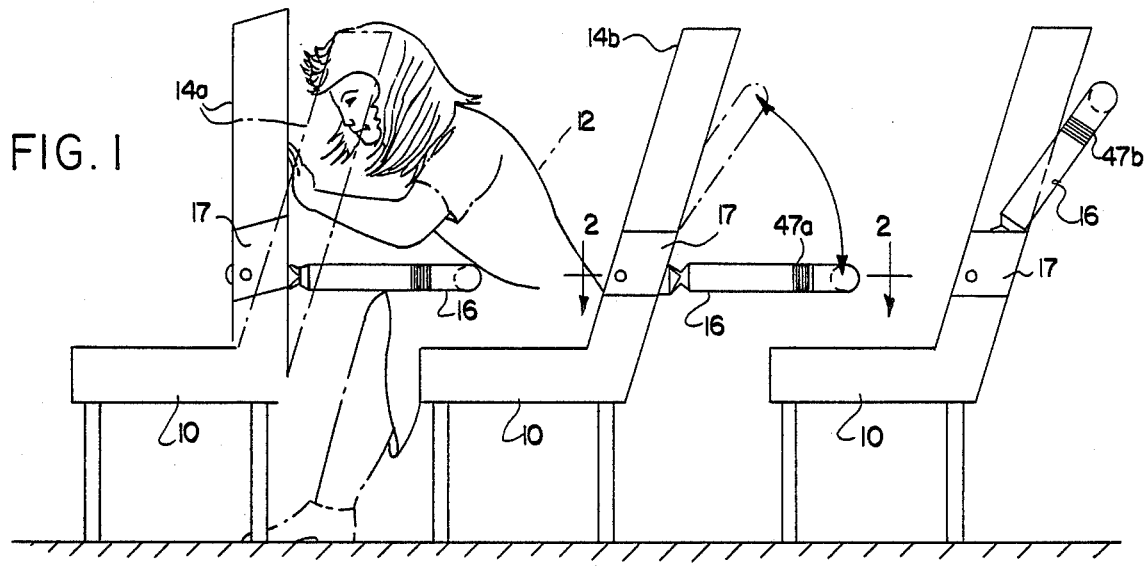
FIG. 1 is a schematic fragmentary side elevational view, illustrating certain details of the invention.

As shown in FIG. 1, a plurality of bench seats 10 of the type used in school buses are shown, with a person 12 shown seated in a middle seat. The seats 10 have an upper portion 14 and are fitted with the restraining bar 16 of the present invention which is attached to the upper portion of the seat 14 by a hinge plate means 17, described in greater detail hereinbelow.

The restraining bar 16 is attached via hinge plate 17 to a forward seat 14a to restrain passengers 12 in the rearward seat 14b which is directly behind the seat 14a. Of course, each succeeding seat behind the forward seat is to be fitted with the restraining device of this invention so that all of the seats in the school bus or other vehicle are fitted with the restraining device as described herein. If it is convenient, a restraining device of the same type may be placed on a frame in front of the forward seat so as to provide the same type of protection for passengers. However, when an upright portion 14 of the seat 10 in front of the forward seat 14a is not available, it may be desirable to install harness type seat belts for these front or forward seat positions.

Figure 2:
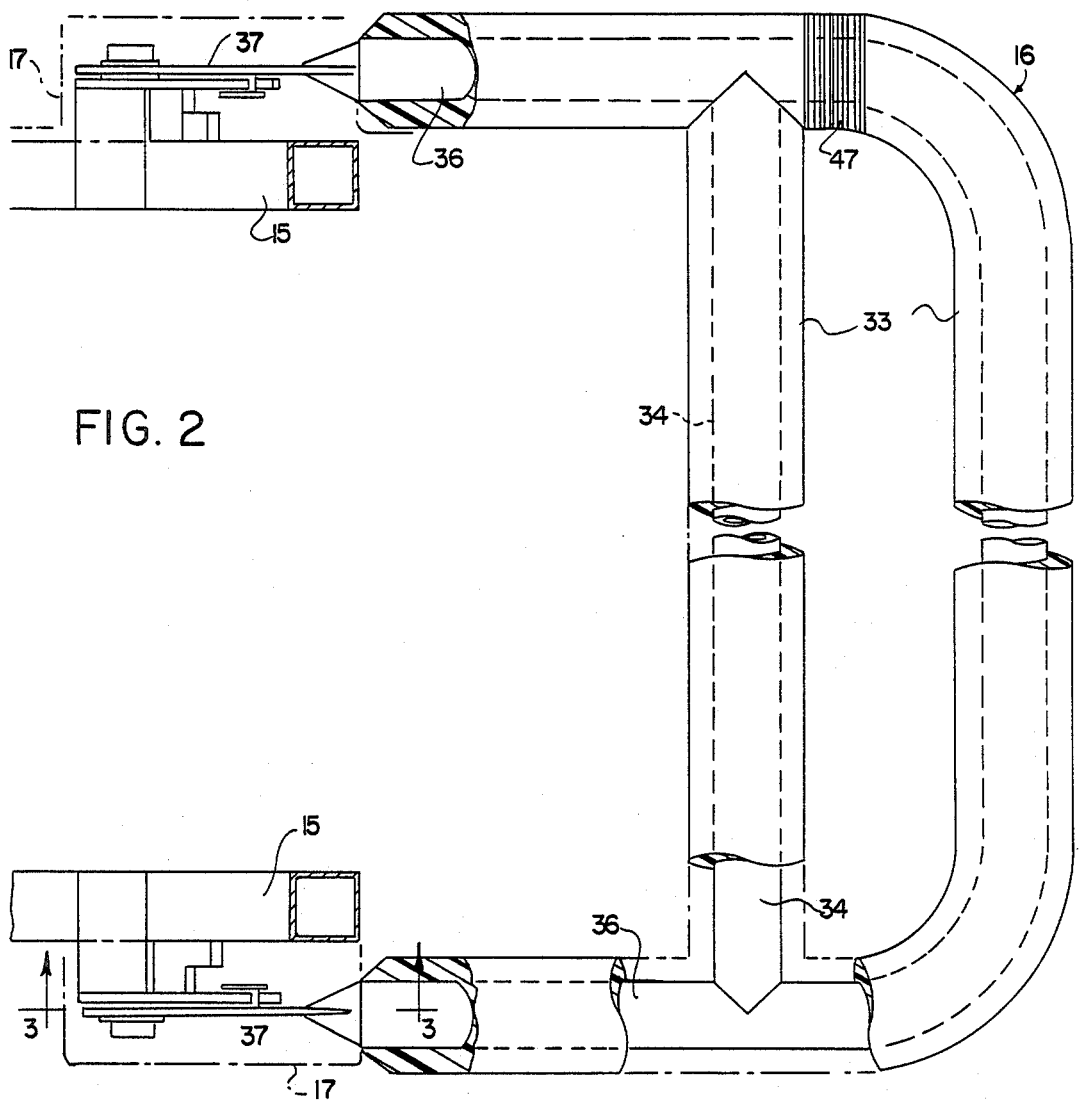
FIG. 2 is an enlarged, fragmentary plan view, taken along the lines 2—2 of FIG. 2. The safety bar is in the normal riding mode, horizontal.
Figure 4:
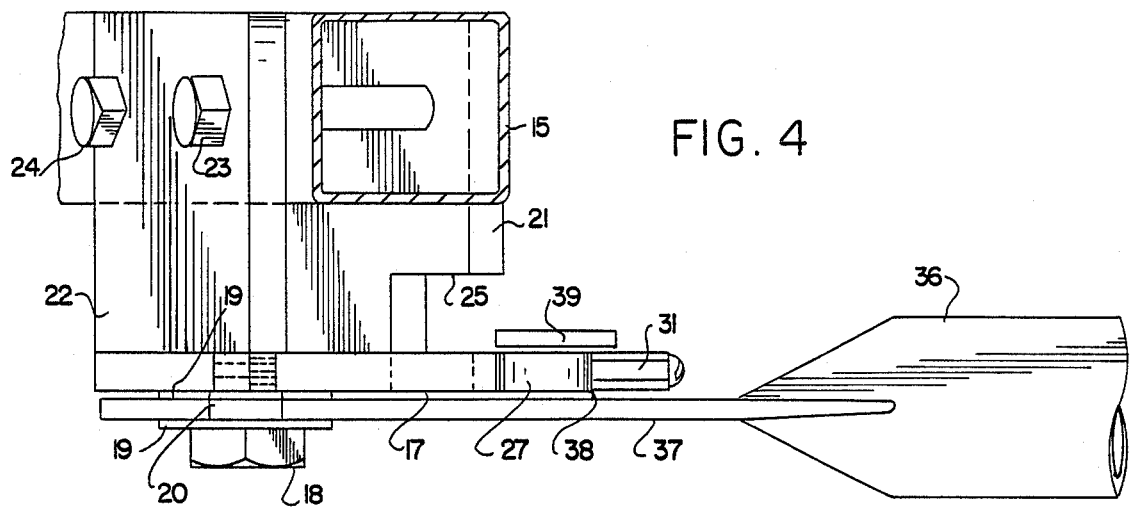
FIG. 4 is a plan view of the assembly shown in FIG. 3, with the safety bar in the normal travel position.

The restraining device 16 is shown in greater detail in FIG. 2 and comprises the restraining tube 16 which is covered with foam padding 33 or other protective material. Connected between two side arms 36 of the restraining bar 16 is a lap table support bar 34 which is also covered by padding 33. The restraining bar 16 arms 36 extend to the frame 15 of the upper seat portion 14. The arm tubing 36 has a flat portion 37 which is cooperatively attached to the frame via a hinge plate as herein described.

Figure 5:
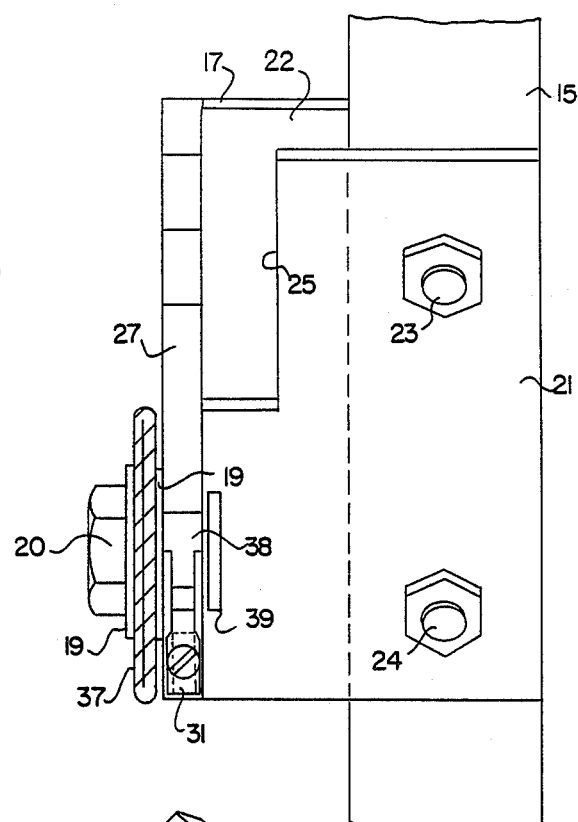
FIG. 5 is a fragmentary, transverse, sectional, elevational view taken along the line 5—5 of the FIG. 3, showing additional details of the hinge bracket assembly and associated safety bar.
Figure 6:
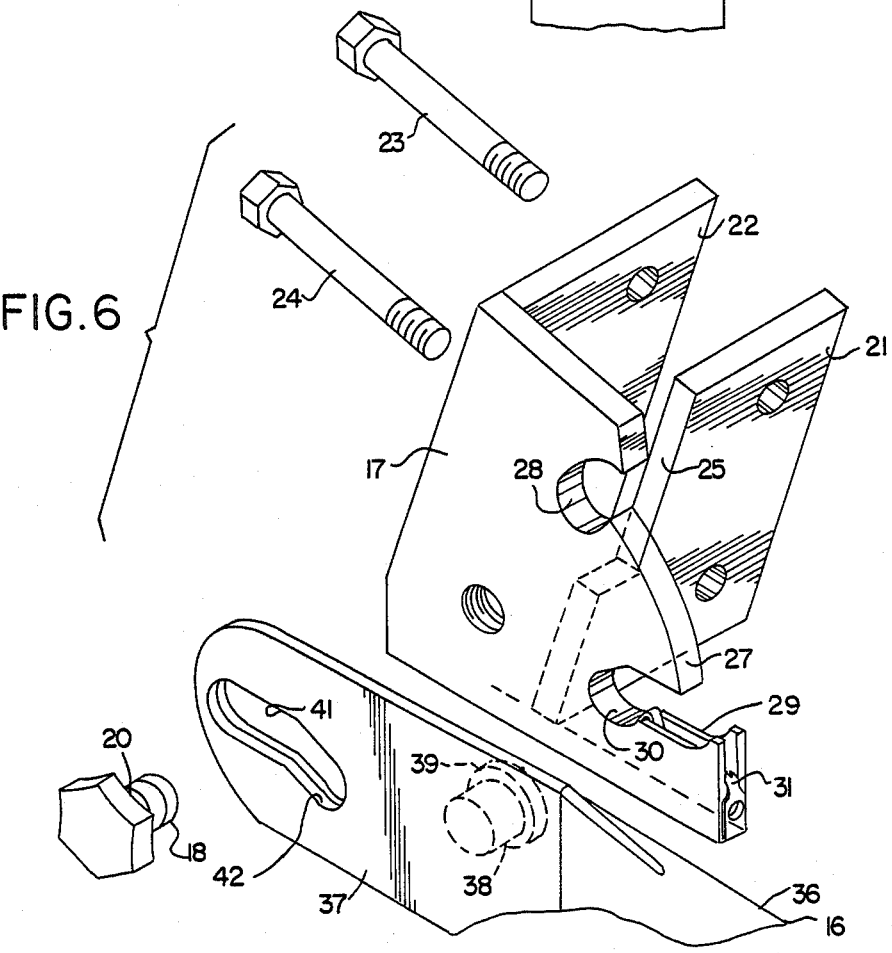
FIG. 6 is an exploded isometric view of the hinge bracket assembly, the anchoring terminal end of the safety bar, the safety bar slot and its associated lock pin.

Turning now to FIGS. 5 and 6, the hinge plate 17 is mounted on frame 15 as shown herein. The hinge plate 17 has a pair of mounting flanges 21 and 22 which extend toward frame 14 and which are fastened to frame 15 via mounting bolts 23 and 24. Thus the hinge plate 17 is securely mounted to the frame 15 of the upper portion of the seat 14. Plate 21 may have a notch 25 cut for appropriate clearance when the restraining bar 16 is moved to various positions, as will be described hereinafter. The hinge plate 17 presents a profiled cam with a generally arcuate rear face 27 which will cooperate with the flat portion 37 of arms 36 of the restraining bar 16. The bar 16 extends transverse across the lap of the person 12 when the bar 16 is in its horizontal position.

Initially, the bar 16 is a more vertical position and is held in the upper limit position shown by notch 28 which permits access and egress by the passengers. The arcuate face 27 of the cam profile of plate 17 also has a lower limit position 29 which serves to support the bar 16 when it is in a substantially horizontal position. Finally, the arcuate rear face 27 of plate 17 has a lower locking position 30 which cooperates with the restraining bar 16 when the bar 16 is subjected to force such as that caused by a collision. Spring 31 serves to hold the bar in the lower position 29.

The flat portion 37 of arm 36 is carried from the upper limit position 28 along cam surface 27 to the lower limit position 29 of hinge plate 17 by means of a lock pin 38 and retaining flange 39 mounted in flat portion 37. The flat portion 37 of arm 36 also cooperatively acts with flange plate 17 through the action of a shouldered pivot pin 20 in pivot pin slot 41. Pivot pin 20 is fastened to hinge plate 17 via threaded portion 18 and washers 19 as illustrated in FIG. 5. The slot 41 of the flat arm 37 also has a lower point 42 which facilitates the movement of bar 16 with respect to hinge plate 17.

As is now apparent, the restraining bar 16 is mounted to the flange 17 in two places. Pivot pin 20 is fastened to the hinge plate 17 and carries the flat arm 37 in slot 41. Lock pin 38 is carried by flat arm 37 and rides along the arcuate surface 27 of the rearward facing profiled cam of hinge 17 from the upper limit position 28 to the lower limit position 29 and in fact into lower locking position 30.

Figure 3:
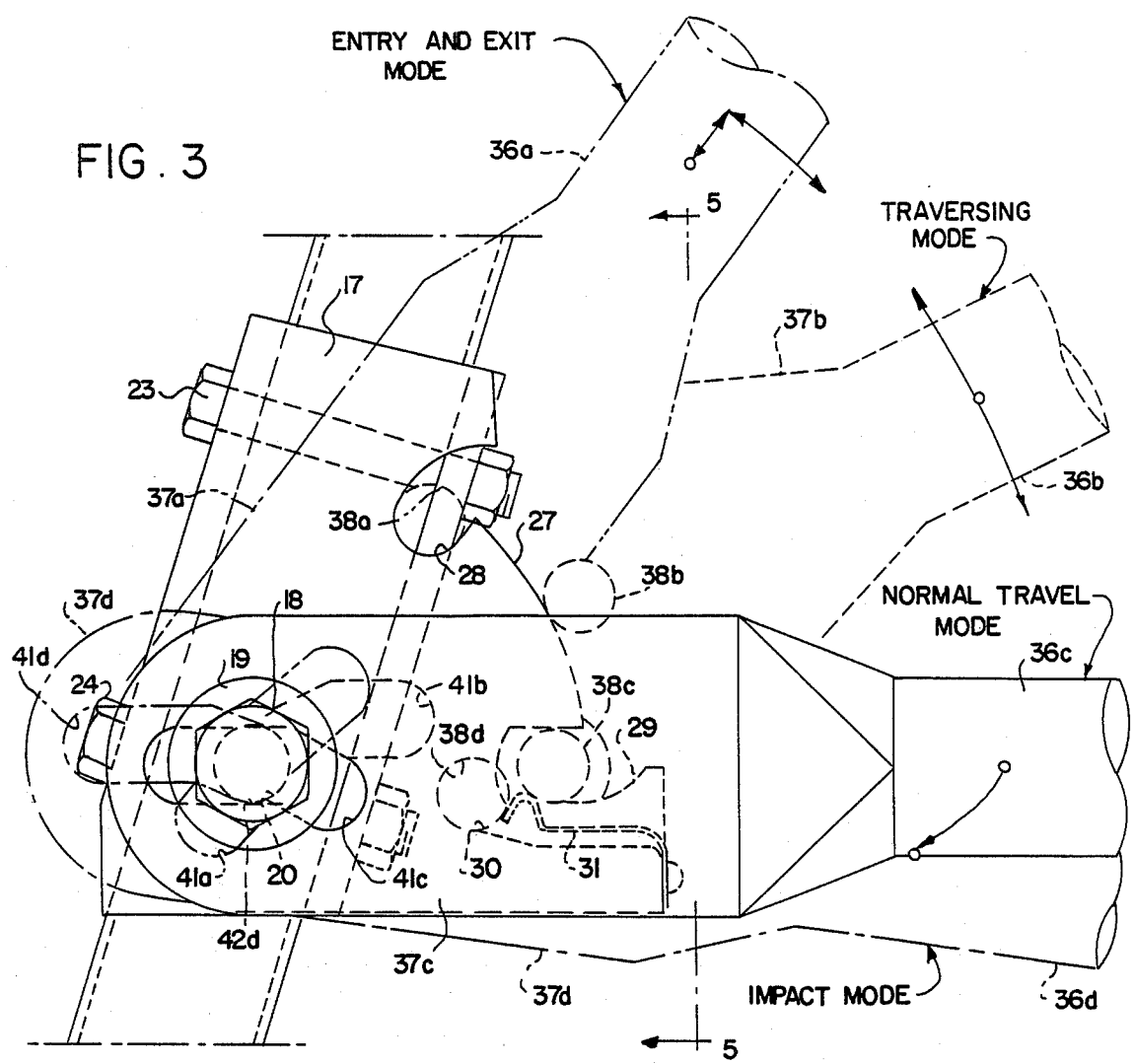
FIG. 3 is a greatly enlarged fragmentary side elevational view of the hinge bracket assembly and the anchored terminal end of the preferred embodiment, taken along the line 3—3 of FIG. 2, showing three static positions of the safety bar and one dynamic position.

The position of the bar 16 with respect to the hinge 17 is shown in FIG. 3 in three static positions and one dynamic position. When the bar and arm 36a is in a substantially vertical position, so as to permit entry into the seat, the locking pin 38a is in the upper limit position slot 28 of the arcuate face 27 of hinge plate 17. Bolt shoulder 18 and washers 19 and pin 20 hold the arm 37a pivot which passes through slot 41a of arm 37a. This position for the restraining bar 16 is normal when the seat is unoccupied.

Movement of the bar 16 to a position to protect the passenger is accomplished by lifting the bar 16 so as to remove pin 38a from the upper limit position slot 28. The pin 20 moves along slot 41a as the bar 16 is lifted. At this point, the bar 16 is shown in its transversing mode as arm 36b descends from the entry and exit mode just described. Pin 38b carried by the flat arm 37b slides along the arcuate rear face 27 of the cam projection of hinge plate 17. The pivot pin 20 is free to travel within the limits of slot 41b as the arm 36b is lowered.

Once the restraining bar 16 has been lowered into a position across the lap of the person riding in the seat, the arms 36 are shown in their normal travel modes. Arms 36c are substantially horizontal and extend transverse across the lap of persons 12 as shown in FIG. 1. When the arm 36c is in the normal travel mode, flat arm 37c engages lock pin 38c in the lower limit position 29. Again, pin 20 slides in the slot 41c and the flat portion 37c of the restraining bar 16 are supported at the two positions of lower limit position 29 with pin 38c and the pin 20 in slot 41c. Spring 31 keeps the pin 38c in position 29. At the completion of travel, when the passenger is permitted to exit from the seat, the bar 16 is pulled back to the person 12 so that pin 38c is removed from lower limit position 29. The pin 38 is then free to slide along the arcuate face 27 to the upper limit position 28 as previously described.

In the event of a collision or impact, or other circumstance which forces the person to be thrown against the restraining bar 16, the arm 36d moves away from the passenger under the force of the impact as the passenger presses on the padding 33 of the bar 16. The pin 38d which is carried on flat arm 37d moves out of the lower limit position 29 into a lower locking position 30 over spring 31. It is noted that the pin 38d is now lower than pin 20. Pin 20 now resides in the lower portion 42d of slot 41d which forces the arm 37d to occupy the impact mode as shown in FIGS. 1 and 3. Even if the upper portion 14a of the seat is moved forward during impact, the bar 16 is moved to a lower position on the lap of the passenger 12. This is accomplished because the locking pin 38d is lower than the pivot pin 20. The movement of the restraining bar to this lower position not only prevents the bar from raising up during impact to potentially injure the ribs or upper body portions of the passenger, but it positively acts to keep the person in the seat and prevent a submarining effect which might otherwise be caused.

Also shown in FIGS. 1 and 2 is an additional safety feature which may be provided with the device of the present invention. A numbered flag 47 is placed on each of the various safety bars 16 so that the number contained on the flag 47 is visible in the rear view mirror from the driver's seat or from another point of observation by a school bus monitor. When the seat is in the horizontal position as shown in FIG. 1, flag 47a is out of sight and will not be visible from the point of the observer. However, when the restraining bar 16 is in the vertical position, flag 47b is visible to the observer upon inspection. The passenger can then be reminded to lower the restraining bar to its normal travel mode.

The restraining bar of the present invention has been installed on a plurality of seats of the type used in school buses and tested through the use of sled impact tests. Tests, data and high-speed film have demonstrated the effectiveness of the restraining bar of this invention in preventing injury to passengers during impact. The efficiency of such protection when coupled with the ease of manufacture, low cost, easy assembly and the ability to rapidly monitor the use of the device is seen to present the first satisfactory solution to the problem of adequately protecting the safety of passengers in school buses.

What is claimed is:

1. A restraining device for use with bench seats of the type used in school buses, wherein a restraining bar is attached to a forward seat to restrain passengers in the rearward seat directly behind said forward seat, comprising:

a hinge plate means mounted on the frame of the forward seat, said plate means presenting a profiled cam with a generally arcuate rear face having an upper limit position, a lower limit position, and a locking lower position, said plate means having a pivot pin on the outside of said plate means; and a restraining bar having a restraining support sized to be positioned across the waist of passengers seated in the rearward seat, said restraining bar having an arm at each end of said support and extending to the frame of the forward seat, said arm having a slot sized to receive said hinge plate means pivot pin and said arm further having a lock pin sized and positioned to cooperatively contact said generally arcuate rear face to position said arm generally vertically in said upper limit position and generally horizontally in said lower limit position.

2. The device of claim 1, wherein said slot and lock pin on said arm cooperate with said pivot pin and arcuate rear face on said hinge plate to define a normal first horizonal position for said arm, placing said restraining bar approximate the waist of the passengers and a second locking lower position in which the lock pin is lower than the pivot pin when the restraining bar is forced towards the forward seat, thereby moving said restraining bar to a lower position on the lap of the passenger.

3. The device of claim 2, wherein said slot in said arm interact with the pivot pin in said hinge plate means to define a first normal horizontal position with respect to said lock pin on said arm, and said slot on said arm further includes a lower portion for engaging said pivot pin on said hinge plate when said restraining bar is forced toward said forward seat to cause said arm to pivot about said lock pin to move said restraining bar to a lower position on the lap of said passenger.

4. The device of claim 1, wherein said restraining bar further includes an identifying insignia visible to a point of observation when said restraining bar is in a generally vertical position.

5. The device of claim 1, wherein said restraining bar support includes a first transverse tube positioned adjacent the waist of passengers seated in the rearward seat and a second transverse tube attached to said arms of said restraining bar and in a spaced parallel position with respect to said first tube.

6. The device of claim 5, wherein said tubes are provided with protective padding.

7. A restraining device for use with seats of a vehicle attached to one seat of the vehicle to restrain passengers in another seat behind said one seat comprising:

restraining bar member pivotally mounted on the frame of said one seat restraining support adapted to be positioned across the waist of the passenger seated in said other seat, means for positioning said restraining bar member in a first locking position approximate the waist of the passenger, wherein said restraining bar member is disposed in a predetermined first plane and for moving said restraining bar member forwardly upon vehicle impact to a second locking position from said first locking position below said first predetermined plane, wherein said restraining bar member is located in a lower position on the lap of a passenger.

8. The device of claim 7, wherein said restraining bar further includes an identifying insignia visible to a point of observation when said restraining bar is in a generally vertical position.

9. The device of claim 7, wherein said restraining bar support includes a first transverse tube positioned adjacent the waist of passengers seated in the rearward seat and a second transverse tube attached to said arms of said restraining bar and in a spaced parallel position with respect to said first tube.

10. The device of claim 7, wherein said tubes are provided with protective padding.

11. The device of claim 7 which further includes a hinge plate means mounted on the frame of the forward seat and cooperatively attached to said restraining bar member and having a pair of arms attached to said hinge plate, said hinge plate and said restraining bar having a first normal position for placing said restraining bar across the waist of said passengers and a second locking lower position when said restraining bar is forced toward the forward seat, thereby moving the restraining bar to a lower position on the lap of the passenger.

12. The device of claim 7 which further includes a hinge plate means mounted on the frame of the forward seat, said plate presenting a profiled cam with a generally arcuate rear face having an upper limit position, a lower limit position, and a locking lower position, said plate means having a pivot pin on the outside of said plate; and said restraining bar member is attached to said hinge plate means, said restraining bar member having an arm at each end of said support and extending to the frame of the forward seat, said arm having a slot sized to receive said hinge plate pivot pin and said arm further having a lock pin sized and positioned to cooperatively contact said generally arcuate rear face to position said arm generally vertically in said upper limit position and generally horizontally in said lower limit position.

13. The device of claim 12, wherein said slot and lock pin on said arm cooperate with said pivot pin and arcuate rear face on said hinge plate to define a normal first horizontal position for said arm, placing said restraining bar approximate the waist of the passengers and a second locking lower position in which the lock pin is lower than the pivot pin when the restraining bar is forced towards the forward seat, thereby moving said restraining bar to a lower position on the lap of the passenger.

14. The device of claim 13, wherein said slot in said arm interacts with the pivot pin in said hinge plate means to define a first normal horizontal position with respect to said lock pin on said arm, and said slot on said arm further includes a lower portion for engaging said pivot pin on said hinge plate when said restraining bar is forced toward said forward seat to cause said arm to pivot about said lock pin to move said restraining bar to a lower position on the lap of said passenger

* * * * *